Patented Nov. 8, 1949

2,487,254

UNITED STATES PATENT OFFICE 2,487,254

PROTECTIVE COATINGS FOR SYNTHETIC RESIN SURFACES

Paul L. Mahoney, Jackson Heights, N. Y., assignor to United States Rubber Company, New York, N. Y., a corporation of New Jersey No Drawing. Application April 7, 1948, Serial No. 19,639

2 Claims. (Cl. 117—6)

This invention relates to protective coatings for plastic glass and other rigid surfaces, and more particularly to temporarily protecting such surfaces during handling, shipping, storage, and the like.

The present invention relates primarily to temporary coatings for plastic glass and other rigid surfaces for protection during handling, shipping, storage and the like that may be readily peeled off in large pieces, and that on removal, as by stripping, will leave the plastic glass or other surface in an undamaged condition. The term "plastic glass" is used in its commonly accepted sense as descriptive of the clear synthetic plastic resins which are available in sheet and other forms and which may be shaped as by molding at relatively low temperatures, for example, 135° F. to 300° F. Examples of such plastic glass are methyl methacrylate resin, commercially available in sheet form under the trade names "Lucite" and "Plexiglas," cellulose acetate, available under the trade name "Lumarith" and other trade names, and ethyl cellulose. The present invention may also be used to protect plastic glass surfaces during shaping operations.

According to the present invention, a satisfactory protective film or coating may be sprayed on a plastic glass or other rigid surface from an aqueous suspension of a plasticized water-insoluble polyvinyl acetal resin if the solids concentration of the suspension is within the range of 35 to 60% and preferably from 40 to 50%. The term "aqueous suspension" is used herein in its commonly accepted meaning as a colloidal dispersion of a solid in a liquid, viz., water. In such aqueous suspensions of polyvinyl acetals, the solid polyvinyl acetal is the dispersed or discontinuous solid phase and the water is the external or continuous liquid phase. The preferred polyvinyl acetal resin is polyvinyl butyral. The polyvinyl acetal resin must be plasticized before it is dispersed in the water and also in order to form a readily stripable protective film on the article to be protected. The plasticizer must be compatible with the polyvinyl acetal so that it will not bleed out and migrate to the surface of the article being protected, and it must be non-reactive or incompatible with the article to be protected so that it will not injure the surface of the article. The preferred plasticizer for the polyvinyl acetal is castor oil, which is compatible with polyvinyl acetals and incompatible with polymerized methyl methacrylate plastic glass. The castor oil may be raw or blown. Polyvinyl acetal resins are well known. Polyvinyl butyral is generally prepared by the condensation of polyvinyl alcohol with butyraldehyde. Other polyvinyl acetal resins, such as polyvinyl formal, polyvinyl acetal, polyvinyl heptal, polyvinyl propional, polyvinyl furfural which are similarly produced by the condensation of polyvinyl alcohol with the appropriate aldehyde, such as formaldehyde, acetaldehyde, heptaldehyde, and so forth, may also be used.

In preparing the aqueous suspension of the polyvinyl acetal resin, the resin, such as polyvinyl butyral, may be plasticized as in an internal mixer, such as a Werner & Pfleiderer mixer, with castor oil in amounts of about 20 to 100 parts castor oil to 100 parts of polyvinyl acetal resin. A hydrophilic colloidal dispersing agent, such as a soap, may be then introduced into the plasticized resin, and water may be slowly added until a change in phase takes place and the plasticized water-insoluble resin particles become dispersed in the aqueous medium. The method of dispersing various water-insoluble synthetic resins in an aqueous medium by introducing a hydrophilic colloidal dispersing agent and subsequently adding water while masticating the resin, as in an internal mixer, is known. Such a method eliminates the necessity for the use of volatile organic solvent media as where resins are dissolved in a volatile solvent to give a solvent solution or solvent dispersion, with or without subsequent emulsifying in water of such solvent solution of the resin to give an aqueous emulsion of the organic solvent solution of the resin. Such solvent solutions or solvent dispersions of polyvinyl acetal resins and such aqueous emulsions of these solvent solutions of the resin are unsatisfactory for spraying protective coatings on plastic glass and other rigid surfaces for a variety of reasons. Where the plastic glass is under stress, as from a manufacturing or shaping operation, or where it is in a frame and subject to expansion and contraction, organic solvents will very readily surface craze the plastic glass. The organic solvent must be recovered, which is difficult, if not impossible, with large articles where it is impractical to use closed tunnels, or the like, with adequate recovery systems in the case of hand manipulated spraying operations. The organic solvent vapors are toxic to operators of the spray gun equipment, and there is the added fire and explosion risk with many organic solvents. With the aqueous suspensions of the plasticized polyvinyl acetal of the present invention, large sections of plastic glass, and other large surfaces, as for example, an entire airplane, may be sprayed in the open at room or elevated temperatures, without danger to the operatives, to give a satisfactory readily peelable protective coating. The solids concentrations of the aqueous suspensions of the plasticized polyvinyl acetal must, however, be kept within a definite range in order to give satisfactory spraying. The total solids concentration of the aqueous suspension of the polyvinyl acetal resin should not be above 60%, otherwise it will be too thick for application with a spray gun. The total solids concentration should not be below 35%, otherwise excessive amounts of thickeners would be necessary to give the proper viscosity for spraying and this would adversely affect the spray characteristics. The critical range of solids concentrations of the aqueous suspension of the polyvinyl acetal resin is 35 to 60% total solids, with the preferred range of solids concentrations of 40 to 50% total solids. The polyvinyl acetal must be water-insoluble, otherwise the physical properties of the protective film would be adversely affected by water, as from rain or moist air. For example, a protective film of a water-soluble partial polyvinyl acetal (which contains a large proportion of hydroxyl and/or acetyl groups) if exposed to rain or water, as on an airplane or on a plastic glass section thereof on the deck of a ship, would swell and become gelatinous and lose its strength so that it could not be peeled off in large sheets.

In order to utilize polyvinyl acetal resins as temporary protective coatings to be stripped from the article after there is no further need for such protection, the resin which is itself too hard in film form for such use must be severely plasticized. This plasticization may be made to take place according to the present invention with castor oil where the polyvinyl acetal resin is applied to methyl methacrylate resin, since castor oil has no detrimental affect on a plastic glass such as methyl methacrylate resin. The plasticization of the polyvinyl acetal with the conventional type of ester plasticizers, such as dibutyl phthalate, tricresyl phosphate, and the like, causes surface crazing of the polymerized methyl methacrylate plastic glass on removal of the protective covering by virtue of the reaction of such ester plasticizers on the plastic glass. Such surface crazing of the plastic glass may entirely ruin the plastic glass, or if not entirely ruined, would necessitate the arduous and time-consuming operations of a final polishing of the surface of the plastic glass. Where the polyvinyl acetal is to be applied to articles which are resistant to the effect of such ester plasticizers, as in the protection of wood and metal surfaces, then the polyvinyl acetal may be plasticized with such conventional ester plasticizers before dispersing in water. The castor oil used as a plasticizer for the polyvinyl butyral will permit a film or coating of such plasticized resin to be applied from an aqueous suspension of the same onto a plastic glass surface and to remain in contact with such surface at room temperatures, or at elevated temperatures such as those used for shaping the plastic glass, as for example, 135° F. to 300° F. without the detrimental effect of surface crazing caused by the usual ester type plasticizers commonly used for synthetic resin materials.

The following illustrates the preparation of an aqueous suspension of polyvinyl butyral for use as a protective covering according to the present invention.

To 100 parts of commercial polyvinyl butyral resin powder in a Werner & Pfleiderer mixer heated to around 100° C., was added 50 parts of castor oil and the mixing continued until a smooth plasticized mass was obtained. The mixer was allowed to cool to approximately room temperature and 5 parts of a fatty acid, oleic acid, were mixed well into the plasticized resin, followed by a small amount of water. Sufficient caustic alkali dissolved in a small amount of water was added to the mass to neutralize the oleic acid. The alkali will not saponify the castor oil under these conditions. Water was added slowly with constant pulling of the plastic mass by the rotating blades of the mixer until an inversion of phase took place, and further water was added to the desired solids content of about 50% solids. Such a dispersion may readily be applied to surfaces to be protected as by dipping or spraying. Preferably when used as a spray a small amount of thickener, such as casein is added to the mass in the mixer with the addition of sufficient further alkali or of borax to solubilize the casein before inversion of phase is made to take place. Such a dispersion, preferably at around 40 to 50% solids, may readily be applied to the plastic glass or other rigid surface in the form of a coating or film of the thickness adequate for the requisite protection under the conditions of use. It may be thus seen that aqueous suspensions of polyvinyl acetal resins having the necessary solids content for use in protecting articles according to the present invention may readily be prepared without the use of undesirable volatile organic solvents. The aqueous suspensions of polyvinyl acetal resin used in the process of the present invention are thus preferably substantially free from volatile organic solvents, although volatile solvents in amount up to 10% by weight of the water content of the suspension of polyvinyl acetal resin may be added without detrimental effect to the protective film except to somewhat decrease the tensile strength of the film. There does not appear any reason for such volatile solvent additions, since the resin will dry in air readily without the use of volatile solvents. The aqueous suspension of the polyvinyl acetal resin should, of course, be free from any volatile solvents, as well as any plasticizers, of the types which will attack the material of the surface of the article to be protected. Where plastic glass sheeting is to be shaped, as by molding, either with a pressure or a vacuum mold, a film of from .002 to .005 inch is generally sufficient for protection of the face or faces of the plastic glass sheeting which come in contact with forming surfaces of the mold.

The aqueous suspension of polyvinyl acetal resin containing the castor oil may be applied to the plastic glass or other surface to be protected and the film dried at room temperature, or if desired, at somewhat elevated temperatures to increase the drying rate. The aqueous suspension of the polyvinyl acetal resin may be applied to the plastic glass surface of completely formed articles where it is desired to protect the articles during further handling, shipping, storage, and the like. Where the plastic glass surfaces are in a polished or finished condition, but additional operations are needed to be performed on the plastic glass, as for example, in the molding of large articles, such as gun turrets and bomber noses from flat sheets of the plastic glass, the polyvinyl butyral or other polyvinyl acetal may be applied from an aqueous suspension of the plasticized polyvinyl acetal to one or both surfaces of the plastic glass sheeting as by dipping or spraying, and the molding or other operations may then be performed with the protective coating of the polyvinyl acetal resin adhered to the plastic glass throughout such operations. After the shaping or other operations, the protective film of polyvinyl acetal resin may be permitted to remain on the plastic glass through assembly and during further handling, shipping, and storage until it is desired to remove the protective film for the destined use of the article. The polyvinyl acetal film with the castor oil plasticizer may be readily stripped from the plastic glass surface and no etching or surface crazing of the plastic glass results. While the use of an aqueous suspension of a water-insoluble polyvinyl acetal resin containing the castor oil has been described herein specifically with respect to the protection of plastic glass surfaces, it may also be used for the protection of rigid surfaces generally, such as wood, and polished and enamelled metal, as for example by application to an entire airplane, where it is desired to protect all the surfaces during handling, shipping, storage, and the like, and to provide a coating which may be readily peeled off in large pieces leaving the protected surfaces in unharmed condition, and with no need for expending any time in bringing the protected surfaces to pristine condition when there is no further need for the protection. The protective coating of the polyvinyl acetal resin containing the castor oil may be applied to plastic glass sheeting from an aqueous suspension at the place of manufacture instead of the usual paper covering adhered to the plastic glass by means of a so-called pressure-sensitive adhesive. Coatings of the polyvinyl acetal resin containing castor oil may be redispersed in water after stripping, with or without the addition of further castor oil, in the same manner as illustrated above.

This application is a continuation-in-part of application Serial No. 515,592, filed December 24, 1943, and now abandoned.

Having thus described my invention, what I claim and desire to protect by Letters Patent is:

1. The method of protecting a methyl methacrylate surface during handling, shipping, storage and the like which comprises applying to said surface a protective coating which may be readily peeled off in large pieces by directly depositing on said surface the solids of an aqueous suspension of a castor oil plasticized water insoluble polyvinyl acetal resin having a solids concentration within the range of 35 to 60%, said aqueous suspension of polyvinyl acetal resin containing not more than 10% by weight of the water content of the suspension of volatile organic solvent.

2. The method of protecting a methyl methacrylate surface during handling, shipping, storage and the like which comprises applying to said surface a protective coating which may be readily peeled off in large pieces by directly depositing on said surface the solids of an aqueous suspension of a castor oil plasticized water-insoluble polyvinyl butyral resin having a solids concentration within the range of 40 to 50%, said aqueous suspension of polyvinyl butyral resin being substantially free of volatile organic solvent.

PAUL L. MAHONEY.

REFERENCES CITED

The following references are of record in the file of this patent:

UNITED STATES PATENTS

| Number | Name | Date |
|---|---|---|
| 2,245,218 | Murray et al. | June 10, 1941 |
| 2,290,180 | Hershberger | July 21, 1942 |
| 2,372,982 | Richards et al. | Aug. 3, 1945 |